2 Sheets—Sheet 1.

L. LE BLOIS & G. PICENI.

PROCESS OF AND APPARATUS FOR DYEING.

No. 11,620. Reissued July 13, 1897.

WITNESSES:

F. W. Wright

S. C. Connor

INVENTORS.

LEOPOLD LE BLOIS AND GAËTAN PICENI

BY

Howson and Howson

ATTORNEYS.

2 Sheets—Sheet 2.

L. LE BLOIS & G. PICENI.

PROCESS OF AND APPARATUS FOR DYEING.

No. 11,620. Reissued July 13, 1897.

WITNESSES:

F. W. Wright.

S. C. Connor

INVENTORS.

LEOPOLD LE BLOIS AND GAËTAN PICENI

BY

Howson and Howson

ATTORNEYS.

UNITED STATES PATENT OFFICE.

LEOPOLD LE BLOIS AND GAËTAN PICENI, OF ELBEUF, FRANCE.

PROCESS OF AND APPARATUS FOR DYEING.

SPECIFICATION forming part of Reissued Letters Patent No. 11,620, dated July 13, 1897.

Original No. 570,316, dated October 27, 1896. Application for reissue filed April 8, 1897. Serial No. 631,330. Patented in France February 19, 1895, No. 245,234, and June 11, 1895, No. 248,077, and in Belgium July 29, 1895, No. 116,735.

*To all whom it may concern:*

Be it known that we, LEOPOLD LE BLOIS and GAËTAN PICENI, citizens of the Republic of France, residing at Elbeuf, St. Aubin, Seine-Inférieure, France, have invented a Method of and Apparatus for Bleaching or Dyeing Textile and other Materials, (for which Letters Patent have been granted in France, No. 245,234, dated February 19, 1895, and No. 248,077, dated June 11, 1895, and in Belgium, No. 116,735, dated July 29, 1895,) of which the following is a specification.

Our invention consists of improvements in the method and apparatus which form the subject of Letters Patent No. 489,819, dated January 10, 1893, relating to the bleaching and dyeing of cotton and other textile materials, the main object of the present invention being to simplify both the process and the apparatus and to make the process much more rapid and economical.

In the above-mentioned Letters Patent it was explained that the previously-employed boiling of the fibers under pressure and heat was to be replaced by simple impregnation by means of a bath, below the normal boiling-point of water, in a closed vessel, alternately creating a partial vacuum over the bath and passing air through the same. The material thus impregnated was to be removed from the vat and placed in a dipping-wheel in a separate vessel and there submitted to the successive operations of bleaching or dyeing and washing.

To render the operation more rapid and effective and yet simpler and more economical, we have modified the process, as will be hereinafter described, and we carry out all the steps of the operation in one apparatus constructed for the purpose. In this way we do away with the labor, delay, and inconvenience of transferring the material from one apparatus to another.

Figure 1:
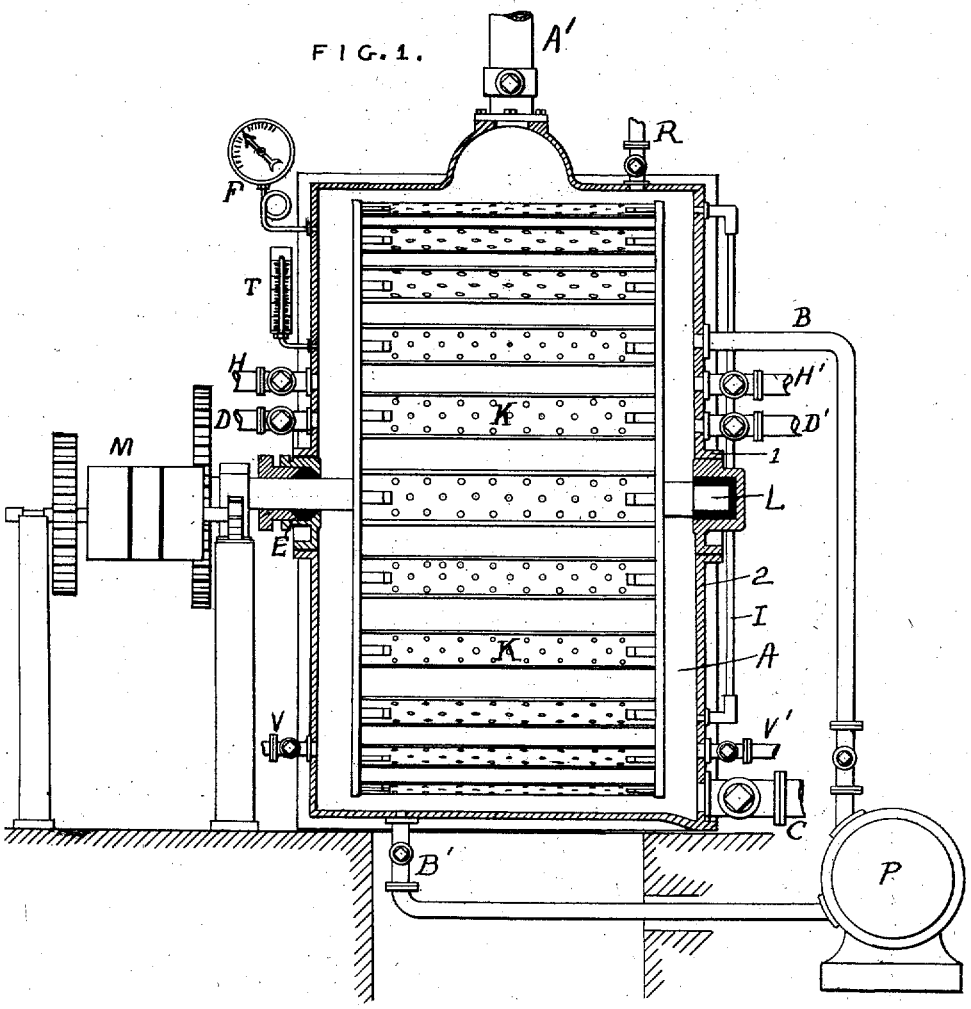
Figure 3:
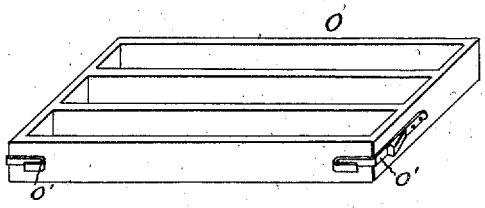
Figure 2:
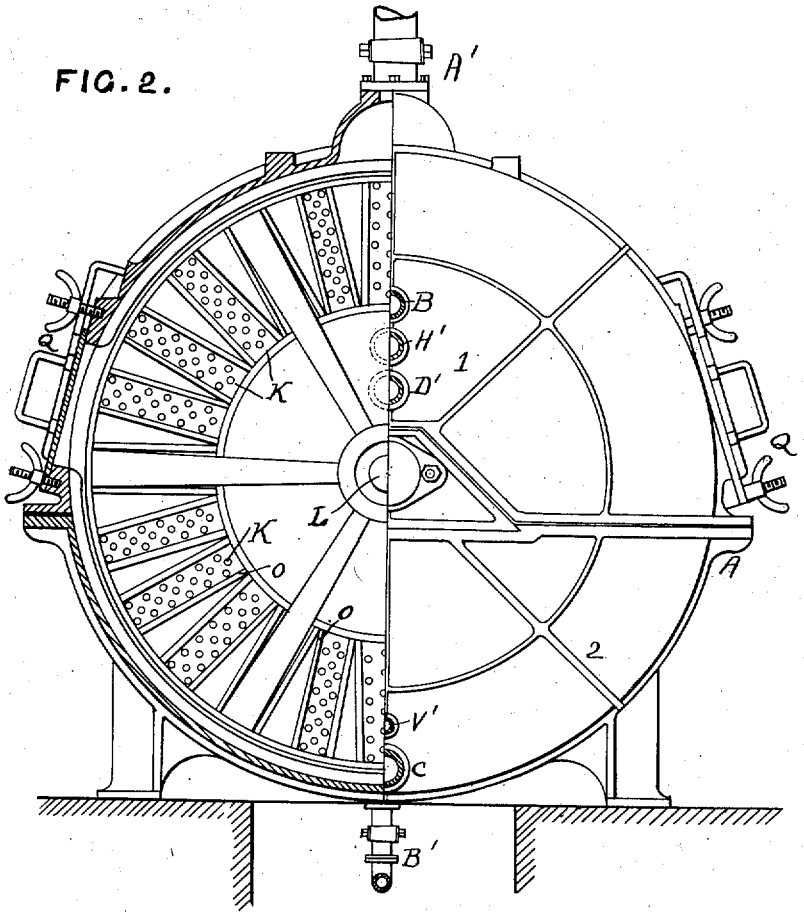
Figure 4:
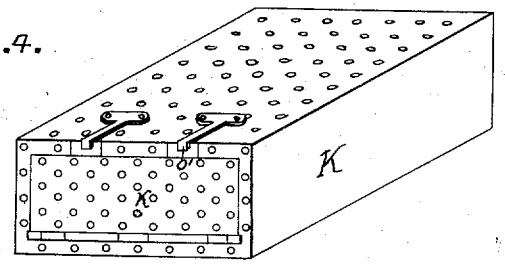

In the accompanying drawings, Figure 1 is a vertical section of the apparatus. Fig. 2 is an end elevation showing one-half in section, and Figs. 3 and 4 are perspective views of different forms of receptacle which may be employed to receive and hold the material to be treated.

The apparatus consists, essentially, of an air-tight vat A, preferably cylindrical, as shown in the drawings, and built to resist more than the vacuum to which it may be subjected in practice. It may be mounted on a suitable foundation and may be built of two parts 1 and 2, placed one above the other and firmly bolted together. In suitable bearings at opposite ends of this vat there is mounted a central horizontal shaft L, carrying within the vat one or more wheels, composed in effect of radially-arranged perforated receptacles K K. At one end of the vat the shaft L passes out through a stuffing-box E and has a further bearing in a suitable framework, which also carries the driving-gear M. This latter should be so constructed that the shaft may at will be driven in either direction.

Suitable openings, closed by doors Q, are provided in opposite sides of the vat A, these openings being of suitable dimensions for the convenient insertion and withdrawal of the fibrous material to be treated or the box containing the same. The covers Q may be closed air-tight by rubber packing. The fibrous material to be treated may be laid in open boxes, such as illustrated in Fig. 3, for instance, to be slid into place in the receptacles K through the openings, which are at other times closed by the doors Q. The shaft L, with its receptacles, is turned to bring the receptacles successively opposite the openings. The boxes O are held in place in the receptacles by spring-catches O′ or other means, engaging with suitable catches in the receptacles K. The shape of these boxes may vary, as also their perforations, but we prefer the rectangular shape shown. They can be made with one or several compartments, according to the materials to be treated. In some cases the boxes O may be dispensed with and the perforated receptacles K may be provided with hinged doors *k*, as indicated in Fig. 4. In this case the fibrous material is put into the receptacles K or withdrawn therefrom by the opening and hinged door *k*.

The upper part of the closed vat A is provided with a valved pipe A′ to be connected to a vacuum-pump. The vat also has valved pipes V and V′, used for admitting air into the bottom of the vat when it is desired to let air enter through the vat and the materials therein under the vacuum which has been created. These pipes may also be adapted to be connected instead to a steam-boiler to supply heat to the bath during treatment when required, or the heat may be supplied by admitting the steam into the liquid bath through a perforated pipe extending into the bottom of the vat or by circulation of the steam through closed piping in the vat.

Valved pipes B and B′ are connected to a rotary pump P, placed outside the vat, Fig. 1. These pipes open into the vat at different points, so that when the pump P is put in operation the liquid bath in the vat may be caused to continuously circulate through the material to be treated. The vat is also provided with a vacuum-gage F, a thermometer T, water-gage I, and an air-cock R.

To the opposite ends of the vessel or vat are connected valved pipes H H′, which are adapted to be connected to an outside tank or tanks in which the different baths are prepared. At one end of the lower part of the vat is provided a valved discharge-pipe C, by which the spent liquid contents of the bath may be discharged.

The apparatus and its parts may vary in size and shape according to the nature, condition, and quantities of the material to be treated at one operation.

We will now describe our process as carried out in the apparatus which we have set forth, premising that in some cases, depending on the materials to be treated and the results to be attained, it is not necessary to use all the steps described.

The perforated receptacles forming the wheel or wheels on the shaft L having been filled with the material to be treated, the doors Q are put in place and hermetically sealed, and the apparatus is otherwise hermetically closed and the shaft carrying the receptacles is put in motion. Then a partial vacuum is created in the vat by opening the valve in the pipe A′, which is connected to the vacuum-pump, and the pipes H H′ are put in communication with the outside tank or tanks containing the impregnating-bath. In a few minutes a suitable vacuum is created, and the valves in the pipes H H′ being opened the bath will rise in the vat until the proper level has been reached, when connection with the outside tank or tanks is cut off. The pipes V and V′ are then opened to the atmosphere. Under the vacuum created air rushes into the vat and rises through the liquid, agitating it. The valves in the pipes V and V′ are closed and again a partial vacuum is formed. During all the time the impregnation is taking place these alternate periods of partial vacuum and admission of air are continued, so that the violent agitation resulting greatly facilitates the thorough impregnation of the material. Where the nature of the material to be treated makes it desirable, a continuous circulation of the bath will be secured during the above-described operation by opening the valves in the pipes B B′ and starting the pump P. This circulation is used where the resistance of the materials to impregnation requires it, as where more or less twisted yarns are to be treated, since such yarns offer greater resistance to impregnation than carded or combed textile material. When the impregnation is completed, the vacuum-pump and the bath-circulating pump are stopped, but the shaft L may continue to rotate. The air-valve R is now opened and the valves in the pipes B and B′ closed, as are also the valves in the pipes H H′. If the impregnating-bath cannot be used again, it may be discharged through the pipe C. If it can be used again, it may be conveyed back to the tanks. The vat having now been emptied of its liquid contents, the valved pipes H H′ are connected with that outside tank which contains the bleaching or dyeing bath. The shaft L may be kept revolving. The valve in pipe A′, connected to the vacuum-pump, is opened after the air-valve has been closed and the vacuum-pump is started. A partial vacuum being thus formed, the valves in the pipes H H′ are opened and the dyeing or bleaching liquid rises in the vat until the required level is reached, when the valves in H H′ are closed. Then the pipes V and V′ are opened to the atmosphere and the alternate admission of air and creation of partial vacuum are repeated, as before described. The circulating-pump P can be brought into use, as in the preceding case, to circulate the dyeing or bleaching liquid through the material to be treated.

When the material has been bleached or dyed, the rotation of the wheels may be stopped, as well as the operation of the vacuum and circulating pumps, and all the valves may be closed except those through which the liquid is to be drawn off, air being admitted through the valve R to permit this.

When it is necessary to wash the material after bleaching or dyeing, the valves in pipes D and D′, in communication with a water-supply, are opened and the valve in the outlet-pipe C is opened, so that a current of water may pass through the vat, all the other valves having been closed. During this operation the shaft L is rotated so as to get a thorough washing of the contents of the receptacles in the wheels.

When shades or colors are to be produced which have to be oxidized by air, the bath has to be drawn off, and by means of the vacuum-pump a current of air is caused to pass through the vat, entering at the bottom through the pipes V and V′. The shaft during this time is put in motion, so as to get a complete oxidation of the material in a very short time compared with that usually found necessary for oxidation in the open air.

We claim as our invention—

1. In the process of bleaching or dyeing textile and other materials, the method consisting in rotating the material through the bleaching or dyeing bath and creating a partial vacuum above the bath and alternately passing air through it.

2. In the process of bleaching or dyeing textile and other materials, the method consisting in rotating the materials through the bath and at the same time creating a rapid and continuous circulation of the bath through the material, creating a partial vacuum above the bath and alternately passing air through it, substantially as described.

3. An apparatus for bleaching or dyeing textile and other materials, comprising a closed vat having a rotary wheel or wheels therein with receptacles for the material to be treated, a valved pipe at the upper part adapted to be connected with a vacuum-pump and a valved pipe or pipes at the lower part adapted to be opened to the air.

4. An apparatus for bleaching or dyeing textile and other materials comprising a closed vat having at its upper part a valved pipe adapted to be connected with a vacuum-pump and at its lower part a valved pipe or pipes adapted to be opened to the air, with a rotary wheel or wheels within the vat provided with receptacles for containing the material to be treated and piping connected to different parts of the vat and to a pump whereby the liquid in the vat may be caused to circulate, substantially as described.

In testimony whereof we have signed our names to this specification in the presence of two subscribing witnesses.

LEOPOLD LE BLOIS.
GAËTAN PICENI.

Witnesses:
SARAH Z. BIGELOW,
DUCLOS.